(12) United States Patent
Voves

(10) Patent No.: US 8,376,391 B2
(45) Date of Patent: Feb. 19, 2013

(54) CARGO CARRYING DEVICE

(75) Inventor: Mark A. Voves, Cresco, IA (US)

(73) Assignee: Innovations Unlimited, L.L.C., Cresco, IA (US)

( * ) Notice: Subject to any disclaimer, the term of this patent is extended or adjusted under 35 U.S.C. 154(b) by 699 days.

(21) Appl. No.: 12/568,715

(22) Filed: Sep. 29, 2009

(65) Prior Publication Data

US 2010/0078907 A1 Apr. 1, 2010

Related U.S. Application Data

(60) Provisional application No. 61/101,785, filed on Oct. 1, 2008.

(51) Int. Cl.
*B62B 3/00* (2006.01)
(52) U.S. Cl. ...................... 280/656; 280/47.26
(58) Field of Classification Search ............ 280/30, 280/638, 35, 639, 38, 39, 40, 641, 645, 652, 280/654, 655, 656, 43.1, 47.131, 47.18, 47.24, 280/47.26, 769
See application file for complete search history.

(56) References Cited

U.S. PATENT DOCUMENTS

| | | | | |
|---|---|---|---|---|
| 669,222 A | * | 3/1901 | Ruher | 280/40 |
| 4,239,258 A | * | 12/1980 | Burris | 280/639 |
| 4,253,677 A | * | 3/1981 | Wissler | 280/40 |
| 4,316,615 A | * | 2/1982 | Willette | 280/47.26 |
| 4,448,434 A | * | 5/1984 | Anderson | 280/40 |
| 4,669,743 A | * | 6/1987 | Tipke | 280/42 |
| 4,671,530 A | * | 6/1987 | van der Wouden | 280/656 |
| 4,685,855 A | * | 8/1987 | Celli | 414/482 |
| 4,765,642 A | * | 8/1988 | Struzina | 280/656 |
| 4,768,806 A | * | 9/1988 | Tetreault | 280/656 |
| 4,786,073 A | * | 11/1988 | Harper | 280/656 |
| 4,813,584 A | | 3/1989 | Wiley | |
| 4,961,593 A | * | 10/1990 | Sanders et al. | 280/646 |
| 4,995,129 A | * | 2/1991 | Comardo | 14/71.1 |
| 5,018,651 A | * | 5/1991 | Hull et al. | 224/502 |
| 5,249,823 A | * | 10/1993 | McCoy et al. | 280/656 |
| 5,330,212 A | * | 7/1994 | Gardner | 280/40 |
| 5,340,134 A | * | 8/1994 | Dodson | 280/37 |
| 5,354,090 A | * | 10/1994 | Grovom | 280/656 |
| 5,423,592 A | * | 6/1995 | Spurrier et al. | 297/129 |
| 5,607,176 A | * | 3/1997 | Leib et al. | 280/656 |
| 5,634,221 A | * | 6/1997 | McKinney | 5/620 |
| 5,673,928 A | * | 10/1997 | Jury | 280/645 |
| 5,692,779 A | * | 12/1997 | Hedgepeth | 280/789 |
| 5,853,189 A | * | 12/1998 | Swartzlander | 280/652 |
| 5,887,879 A | * | 3/1999 | Chumley | 280/40 |

(Continued)

OTHER PUBLICATIONS

Cabela's; Trekker Game Cart; Item: 2UG-228304; www.cabelas.com/prod-1/0059824228304a.shtml; Aug. 18, 2008.

(Continued)

*Primary Examiner* — Hau Phan
*Assistant Examiner* — Jacob Meyer
(74) *Attorney, Agent, or Firm* — Zarley Law Firm, P.L.C.

(57) ABSTRACT

A cargo carrying device is provided that is portable device and capable of transporting a load across the ground. The cargo carrying device has frame and a first section connected to a second section by a hinge. A plurality of side support members are connected to the frame as well as an adjustable support member that permits the cargo carrying device to pivot from a first, or generally horizontal position, to a second raised or angled position. The cargo carrying device also has an adjustable handle, a removable axel and removable pair of wheels. The cargo carrying device is mounted to a saddle for attachment to a hitch of a vehicle. This arrangement provides the user with an adjustable and portable cargo carrying device.

16 Claims, 4 Drawing Sheets

U.S. PATENT DOCUMENTS

| | | | | |
|---|---|---|---|---|
| 5,941,542 | A * | 8/1999 | Kalman | 280/38 |
| 6,042,128 | A * | 3/2000 | Dinkins | 280/47.18 |
| 6,079,777 | A * | 6/2000 | Simmons et al. | 297/217.1 |
| 6,099,035 | A * | 8/2000 | Garvin, III | 280/769 |
| 6,139,029 | A * | 10/2000 | Shaw | 280/8 |
| 6,164,683 | A * | 12/2000 | Kalman | 280/656 |
| 6,179,184 | B1 | 1/2001 | Belinky et al. | |
| 6,202,909 | B1 | 3/2001 | Belinky et al. | |
| 6,217,043 | B1 * | 4/2001 | Chumley | 280/40 |
| 6,260,864 | B1 * | 7/2001 | Smith | 280/47.26 |
| 6,270,092 | B2 * | 8/2001 | Darling, III | 280/30 |
| 6,283,496 | B1 * | 9/2001 | Dickmann | 280/656 |
| 6,581,945 | B1 * | 6/2003 | Shapiro | 280/30 |
| 6,585,285 | B2 * | 7/2003 | Koch | 280/656 |
| 6,685,198 | B1 * | 2/2004 | Hartman | 280/1.5 |
| 6,688,635 | B1 * | 2/2004 | Watts | 280/652 |
| 6,733,026 | B1 * | 5/2004 | Robberson et al. | 280/415.1 |
| 6,746,040 | B2 * | 6/2004 | Bordeleau et al. | 280/656 |
| 6,811,179 | B2 * | 11/2004 | Woods | 280/652 |
| 6,811,180 | B1 * | 11/2004 | Molliere | 280/652 |
| 6,846,017 | B2 | 1/2005 | Martin | |
| 6,880,838 | B2 * | 4/2005 | Hjorth | 280/79.2 |
| 6,942,228 | B2 * | 9/2005 | Bunce et al. | 280/30 |
| 6,948,724 | B2 * | 9/2005 | Davis | 280/30 |
| 6,991,250 | B2 * | 1/2006 | Lindsey et al. | 280/651 |
| 7,004,495 | B2 * | 2/2006 | Thurm | 280/656 |
| 7,017,940 | B2 * | 3/2006 | Hatfull | 280/652 |
| 7,032,921 | B2 * | 4/2006 | Swanner | 280/645 |
| 7,052,033 | B2 * | 5/2006 | McDonell | 280/656 |
| 7,055,848 | B1 * | 6/2006 | James | 280/656 |
| 7,073,816 | B1 * | 7/2006 | Larson et al. | 280/656 |
| 7,083,184 | B2 * | 8/2006 | Sawyer | 280/656 |
| 7,097,182 | B1 * | 8/2006 | Liu | 280/42 |
| 7,172,207 | B2 * | 2/2007 | Henry | 280/651 |
| 7,392,994 | B2 * | 7/2008 | Darling, III | 280/47.18 |
| 7,540,528 | B2 * | 6/2009 | Spainhower | 280/656 |
| 7,543,842 | B1 * | 6/2009 | Fiorini | 280/656 |
| 7,651,117 | B1 * | 1/2010 | McGee | 280/656 |
| RE41,126 | E * | 2/2010 | Hurlburt | 414/482 |
| 7,703,795 | B2 * | 4/2010 | Williamson | 280/656 |
| 7,780,185 | B2 * | 8/2010 | McConkey et al. | 280/656 |
| 7,891,697 | B1 * | 2/2011 | Fahrbach | 280/656 |
| 7,963,531 | B2 * | 6/2011 | Panigot | 280/40 |
| 2002/0105169 | A1 * | 8/2002 | Dahl | 280/651 |
| 2002/0195798 | A1 | 12/2002 | James | 280/656 |
| 2003/0062707 | A1 * | 4/2003 | Koch | 280/401 |
| 2003/0102655 | A1 | 6/2003 | Thompson | 280/656 |
| 2003/0197352 | A1 * | 10/2003 | Bordeleau et al. | 280/656 |
| 2003/0205885 | A1 * | 11/2003 | Woods | 280/652 |
| 2004/0032114 | A1 * | 2/2004 | Hagen | 280/656 |
| 2004/0080128 | A1 * | 4/2004 | Lindsey et al. | 280/30 |
| 2004/0080149 | A1 * | 4/2004 | Martin | 280/769 |
| 2004/0100045 | A1 * | 5/2004 | Amacker | 280/30 |
| 2004/0135349 | A1 * | 7/2004 | Palmer | 280/656 |
| 2004/0251661 | A1 * | 12/2004 | Davis | 280/656 |
| 2005/0012308 | A1 * | 1/2005 | Swanner | 280/652 |
| 2005/0184485 | A1 * | 8/2005 | Timmermans | 280/656 |
| 2005/0236814 | A1 * | 10/2005 | Thurm | 280/656 |
| 2006/0170173 | A1 * | 8/2006 | Darling, III | 280/79.2 |
| 2006/0207831 | A1 * | 9/2006 | Moore et al. | 182/20 |
| 2006/0273554 | A1 * | 12/2006 | Henry | 280/652 |
| 2006/0279071 | A1 * | 12/2006 | Spainhower | 280/656 |
| 2007/0001431 | A1 * | 1/2007 | Fiorini | 280/656 |
| 2007/0132208 | A1 * | 6/2007 | Winter et al. | 280/656 |
| 2007/0194542 | A1 * | 8/2007 | Dixon | 280/47.24 |
| 2007/0194560 | A1 * | 8/2007 | Zink | 280/652 |
| 2008/0073871 | A1 * | 3/2008 | Winkel | 280/415.1 |
| 2008/0157493 | A1 * | 7/2008 | McConkey et al. | 280/40 |
| 2008/0197608 | A1 * | 8/2008 | Dixon | 280/654 |
| 2009/0066061 | A1 * | 3/2009 | Winter et al. | 280/639 |
| 2009/0134605 | A1 * | 5/2009 | Norton | 280/656 |
| 2009/0224512 | A1 * | 9/2009 | Winter et al. | 280/639 |
| 2010/0044983 | A1 * | 2/2010 | Panigot | 280/40 |
| 2010/0066069 | A1 * | 3/2010 | Bradshaw | 280/769 |
| 2010/0072730 | A1 * | 3/2010 | Shapiro | 280/639 |

OTHER PUBLICATIONS

Discount-Trailers.com; Hitch Mounted Cargo Carrier; www.discount-trailers.com/hitch-carrier.htm; Sep. 16, 2008.

* cited by examiner

CARGO CARRYING DEVICE

CROSS REFERENCE TO RELATED APPLICATION

This application claims the benefit of U.S. Provisional Application No. 61/101,785 filed Oct. 1, 2008.

BACKGROUND OF THE INVENTION

This invention is directed to a cargo carrying device and more specifically to a portable device that is capable of transporting a load across the ground and can be mounted to a vehicle.

Cargo carrying devices are known in the art. Typically, these devices are mounted to a draw bar that is attached to the receiver of a hitch of a vehicle. While capable of supporting a load these devices are limited to this single purpose. Therefore, there exists a need in the art for a device that addresses this deficiency.

An objective of the present invention is to provide a cargo carrier that can be used for multiple purposes.

Another objective of the present invention is to provide a cargo carrier that is easily mounted on a vehicle.

These and other objectives will be apparent to those skilled in the art based upon the following disclosure.

BRIEF SUMMARY OF THE INVENTION

A cargo carrying device is provided that is a portable device and capable of transporting a load across the ground. The cargo carrying device has a frame and a first section connected to a second section by a hinge. A plurality of side support members are connected to the frame as well as an adjustable support member that permits the cargo carrying device to pivot from a first, or generally horizontal position, to a second raised or angled position. The cargo carrying device also has an adjustable handle, a removable axel and removable pair of wheels. The cargo carrying device is mounted to a saddle for attachment to a hitch of a vehicle. This arrangement provides the user with an adjustable and portable cargo carrying device.

DESCRIPTION OF THE PREFERRED EMBODIMENT

Figure 1:
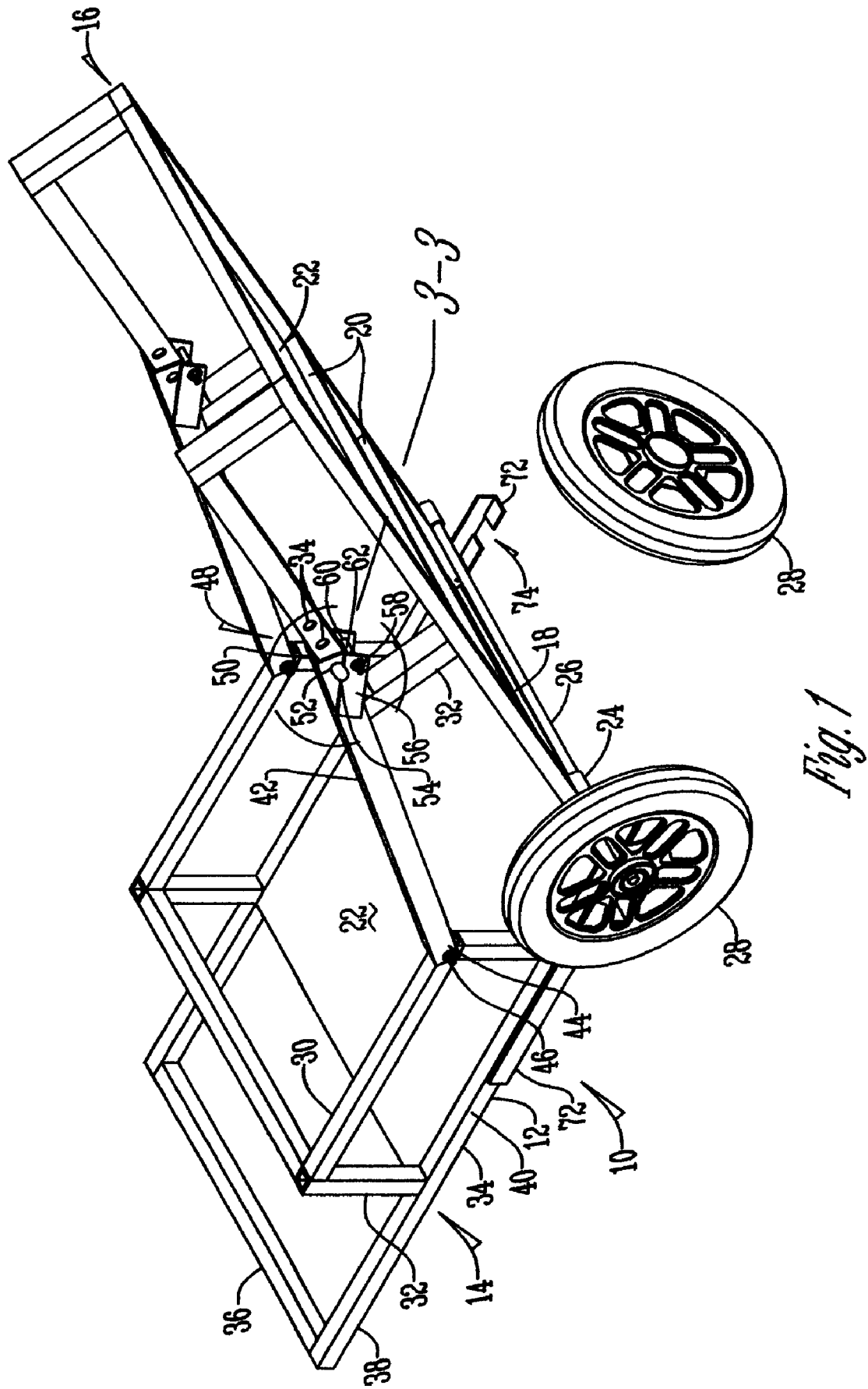
FIG. 1 is a perspective view of a cargo carrying device in an angled position.
Figure 2:
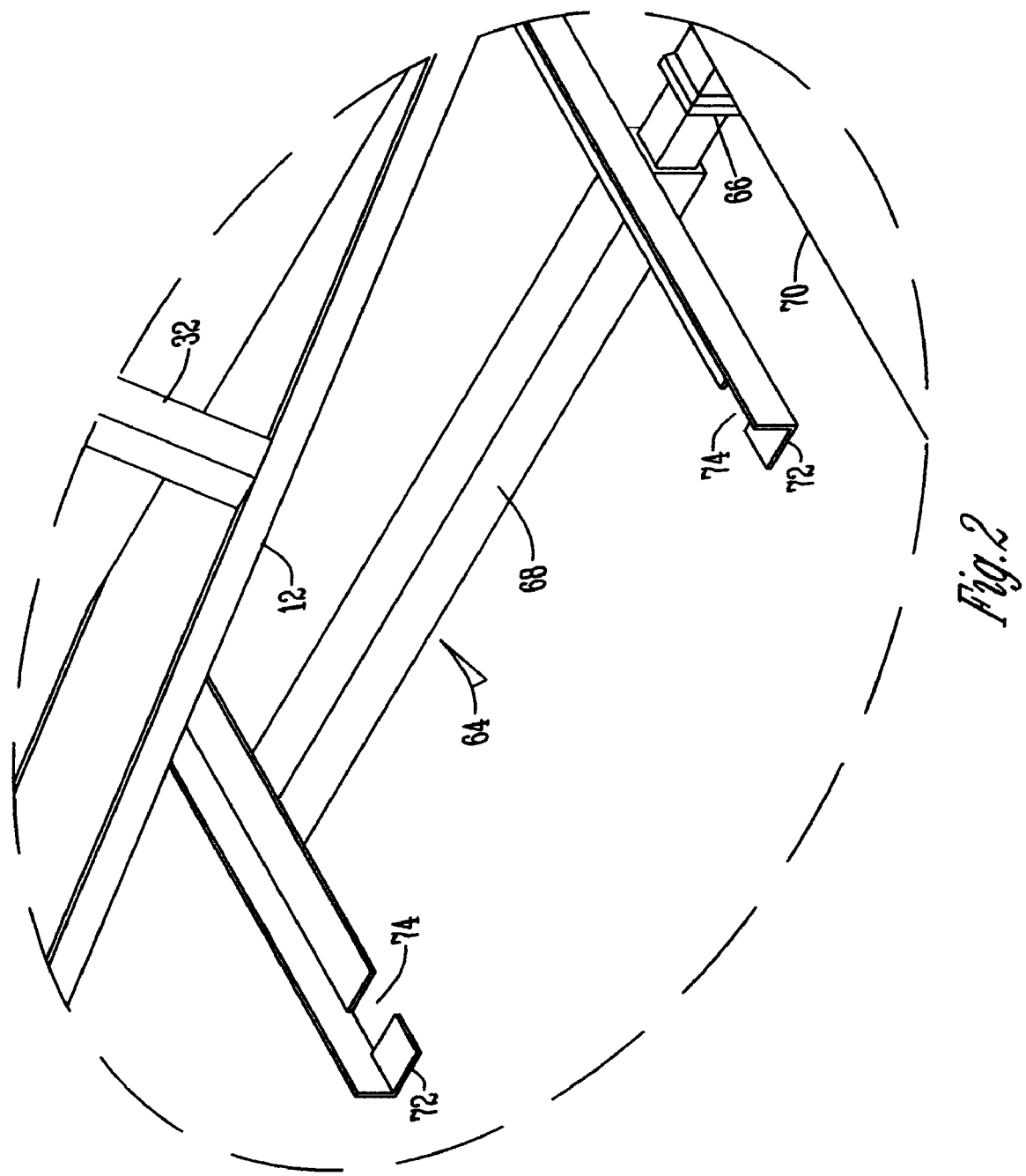
FIG. 2 is a perspective view of a saddle and related components of a cargo carrying device.
Figure 3:
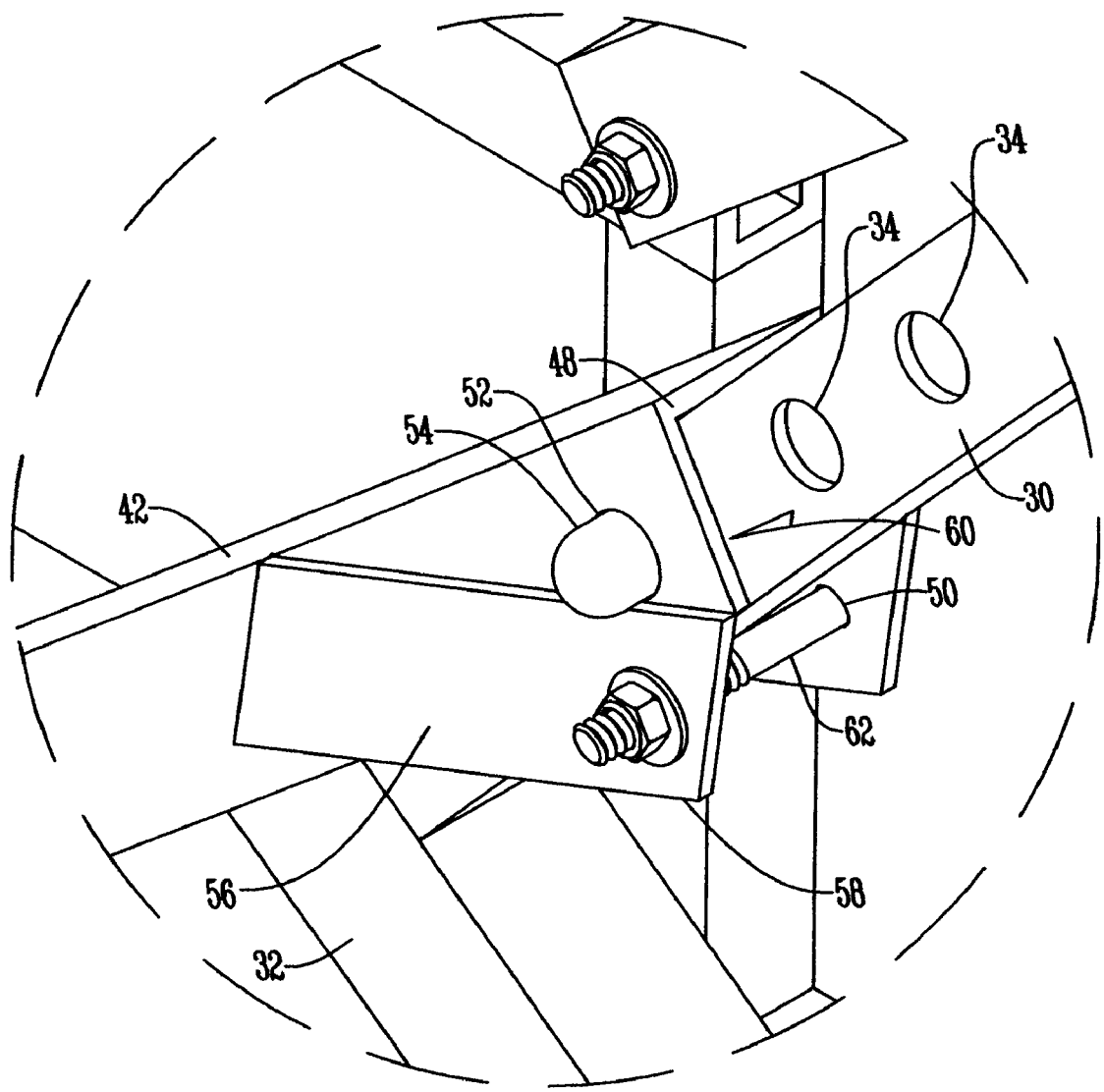
FIG. 3 is a perspective view of an adjustable support member and related components of a cargo carrying device.
Figure 4:
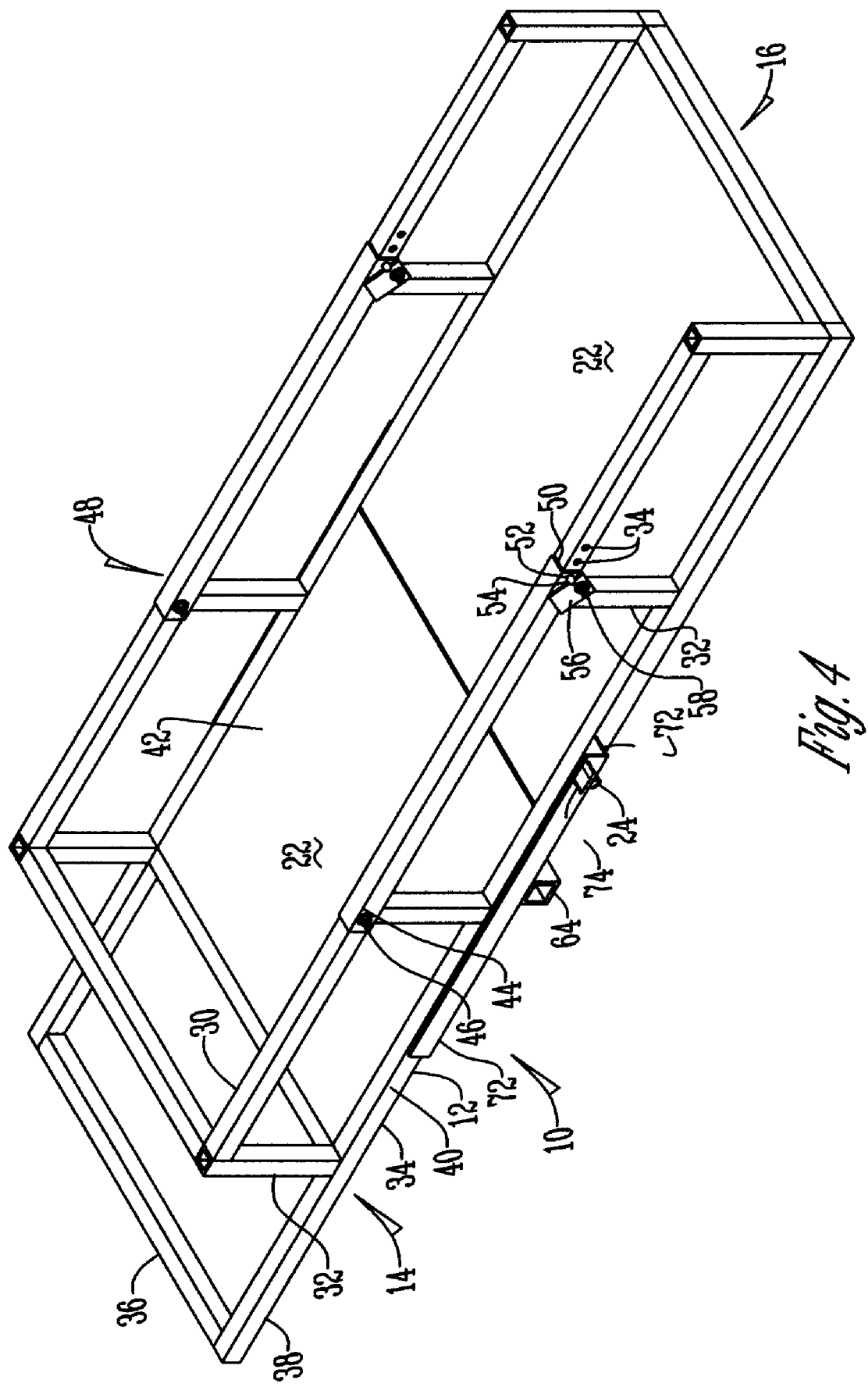
FIG. 4 is a perspective view of a cargo carrying device in a generally horizontal position.

The cargo carrying device 10 has a frame 12 that is comprised of a first section 14 and a second section 16. The first 14 and second section 16 of the frame 12 are connected to one another by a hinge 18. Extending across the frame 12 is a plurality of braces 20 that support plates 22 that are connected to the frame 12. Preferably, the plates 22 are solid and are bent upward at the outer edges to form a sidewall. Connected to the bottom of a plate 22 is a sleeve 24 formed to receive an axle 26. Removably attached to the axle are a pair of wheels 28.

A plurality of side support members 30 are connected to the frame 12 by vertical supports 32. The side support members 30 have a plurality of holes 34 that are used to adjust and secure the position of the cargo device 10. A handle 36 is slidably received within the side support 30. The handle 36 has a plurality of holes 38 that are positioned to align with the holes 34 in the side supports 30. When aligned, a pin 40 is inserted through holes 34 and 38 to secure the handle 36 to the support 30 in a desired position. Alternatively, handle 36 is slidably received within frame 12 and the frame 12 has a plurality of holes 38 that are positioned to align with holes 34 in frame 12 to secure handle 36 to frame 12 with pin 40.

An adjustable support member 42 extends from the first section 14 to the second section 16 and is removably connected to the side support members 30. The adjustable support member 42, at one end 44, is connected to the side support member 30, by a pivot pin 46 that permits the adjustable support member 42 to pivot from a first, or generally horizontal position, to a second raised or angled position.

At the opposite end 48 of the adjustable support member 42 is a partial open sleeve 50 that receives the side support member 30. The sleeve 50 has a hole 52 that is positioned to align with holes 34. When aligned, pin 54 is inserted through holes 34 and 52 to secure end 48 of the adjustable support member 42 to the side support member 30 at a desired position.

Attached to the outer surface of sleeve 50 is a stop support 56. The stop support is angled in relation to the sleeve 50 such that an end 58 of the stop support 56 extends below the sleeve 50. The end 58 has a hole 60 that receives a pin 62. The pin 62, in conjunction with the stop support 56, fits under side support 30 and provides a stop that prevents the first 14 and second 16 sections from extending beyond a horizontal position.

The cargo carrying device 10 is mounted to a saddle 64 that is attached to a hitch 66 of a vehicle. The saddle 64 has a main member 68 that fits within a receiver 70 of the hitch 66. The main member 68 has a pair of L-shaped guides 72 that are transversely mounted above the main member 68. The guides 72 have an opening 74 that, as will be discussed further, assists in securing the device 10 to the saddle 64.

In operation, when the device 10 is in a transporting or angled position, a load is placed upon plates 22 for transport across a ground surface. Without removing the load, the device 10 is mounted to the saddle 64 by positioning the device 10 between the guides 72 such that the bottom surface of the first section 14 rests against the main member 68 of the saddle 64. By pushing downwardly on the handle 36 while at the same time pulling the device 10 across the main member 68, leverage is provided to lift the device 10 with the load. The wheels 28 and axle 26 are then removed and the device 10 is pulled across the main member 68 until the sleeve 24 falls within the opening 74 of the guides 72. The sleeve 24 positioned within the openings 74 prevents lateral movement of the device 10 in relation to the saddle 64.

Once positioned within the openings 74, pin 54 is removed from holes 34 and 52 which permits adjustable support member 42 to slide along side support member 30 until pin 62 engages the side support member 30 to prevent sections 14 and 16 from extending beyond a horizontal plane. In this horizontal position, pin 54 is reinserted through holes 34 and 52 to secure the device in a horizontal position.

Once the device is in the horizontal position, the axle 26 is reinserted into sleeve 24. In this manner, with the ends of the axle 26 extending below the frame 12, the device 10 is prevented from moving in a vertical direction in relation to the saddle 64.

This device 10 having a first section 14 and a second section 16 that are hinged together and pivoted from a generally horizontal position to an angled position moves the pivot point more towards the center of the cargo carrier. As a result less effort is needed to lift and transport a load.

It will be appreciated by those skilled in the art that other various modifications could be made to the device without parting from the spirit and scope of this invention. All such modifications and changes fall within the scope of the claims and are intended to be covered thereby.

What is claimed:

1. A cargo carrying device assembly comprising:
a frame having a first section and a second section;
a hinge connecting the first section to the second section;
a plurality of side support members connected to the frame, wherein the cargo carrying device pivots between a generally horizontal position and an angled position;
the frame removeably connected to a saddle;
the saddle having at least one guide having an opening such that a portion of the cargo carrying device is received within the opening thereby preventing movement of the cargo carrying device; wherein the frame has a sleeve that is removably received within the opening.

2. The device of claim 1 further comprising a handle slidably connected to the frame.

3. The device of claim 1 further wherein the sleeve removably receives an axle.

4. The device of claim 3 wherein the saddle is connected to a hitch of a vehicle.

5. The device of claim 3 wherein the saddle has a main member and a pair of guides.

6. The device of claim 3 wherein the frame is removably positioned within a pair of guides connected to the saddle.

7. The device of claim 1 further comprising a pair of wheels removably connected to the frame.

8. The device of claim 1 further comprising an adjustable support member connected to the side support member.

9. The device of claim 8 wherein a first end of the adjustable support member is connected to the side support member by a pivot pin.

10. The device of claim 8 wherein a second end of the adjustable support member is connected to the side support member by a partial open sleeve.

11. The device of claim 10 wherein the second end of the adjustable support member has a stop support that prevents the first section and second section from extending beyond a horizontal position.

12. A cargo carrying device assembly comprising:
a frame having a plurality of side support members;
an axle and a pair of wheels removably connected to the frame;
a saddle removably connected to the frame;
the saddle removably connected to a hitch of a vehicle;
the cargo carrying device being pivotal between a generally horizontal position and an angled position;
the saddle having at least one guide having an opening such that a portion of the cargo carrying device is received within the opening thereby preventing movement of the cargo carrying device; wherein the frame has a sleeve that is removably received within the opening.

13. The device of claim 12 wherein the frame has a first section and a second section.

14. The device of claim 12 wherein a hinge is positioned between the first section and the second section.

15. The device of claim 12 wherein the sleeve removably receives the axle.

16. A cargo carrying device assembly comprising:
a frame;
an axle removably connected to the frame;
the frame removably connected to a saddle;
the saddle having at least one guide having an opening such that a portion of the cargo carrying device is received within the opening thereby preventing movement of the cargo carrying device;
wherein the frame has a sleeve connected to the frame that removably receives the axle;
wherein the sleeve is removably received within the opening.

* * * * *